US010518251B2

(12) United States Patent
Matsushita et al.

(10) Patent No.: US 10,518,251 B2
(45) Date of Patent: Dec. 31, 2019

(54) HIGH HDN SELECTIVITY HYDROTREATING CATALYST

(71) Applicant: Advanced Refining Technologies LLC, Columbia, MD (US)

(72) Inventors: Koichi Matsushita, Yokohama (JP); Yasuhito Goto, Yokohama (JP); Matthew P. Woods, Pasadena, MD (US)

(73) Assignee: Advanced Refining Technologies LLC, Columbia, MD (US)

( * ) Notice: Subject to any disclaimer, the term of this patent is extended or adjusted under 35 U.S.C. 154(b) by 0 days.

(21) Appl. No.: 15/576,100

(22) PCT Filed: May 13, 2016

(86) PCT No.: PCT/US2016/032474
§ 371 (c)(1),
(2) Date: Nov. 21, 2017

(87) PCT Pub. No.: WO2016/195973
PCT Pub. Date: Dec. 8, 2016

(65) Prior Publication Data
US 2018/0147567 A1  May 31, 2018

Related U.S. Application Data

(60) Provisional application No. 62/167,995, filed on May 29, 2015.

(51) Int. Cl.
| | |
|---|---|
| *B01J 27/188* | (2006.01) |
| *B01J 21/04* | (2006.01) |
| *B01J 27/19* | (2006.01) |
| *C10G 45/02* | (2006.01) |
| *C10G 45/50* | (2006.01) |
| *B01J 37/02* | (2006.01) |
| *B01J 23/00* | (2006.01) |
| *B01J 35/02* | (2006.01) |
| *B01J 35/04* | (2006.01) |
| *B01J 35/10* | (2006.01) |
| *B01J 37/00* | (2006.01) |
| *B01J 37/08* | (2006.01) |
| *C10G 45/06* | (2006.01) |
| *C10G 45/08* | (2006.01) |
| *B01J 23/883* | (2006.01) |

(52) U.S. Cl.
CPC .............. *B01J 27/19* (2013.01); *B01J 21/04* (2013.01); *B01J 23/002* (2013.01); *B01J 27/188* (2013.01); *B01J 35/023* (2013.01); *B01J 35/026* (2013.01); *B01J 35/04* (2013.01); *B01J 35/1019* (2013.01); *B01J 35/1042* (2013.01); *B01J 35/1047* (2013.01); *B01J 35/1061* (2013.01); *B01J 35/1066* (2013.01); *B01J 37/0009* (2013.01); *B01J 37/0201* (2013.01); *B01J 37/0205* (2013.01); *B01J 37/0236* (2013.01); *B01J 37/08* (2013.01); *C10G 45/02* (2013.01); *C10G 45/06* (2013.01); *C10G 45/08* (2013.01); *C10G 45/50* (2013.01); *B01J 23/883* (2013.01); *B01J 2523/00* (2013.01); *C10G 2300/107* (2013.01); *C10G 2300/202* (2013.01)

(58) Field of Classification Search
CPC ...... B01J 27/19; B01J 27/1853; B01J 27/188; B01J 21/04; B01J 35/1019; B01J 35/1042; B01J 35/1047; B01J 35/1061; B01J 37/0201; B01J 37/0236; B01J 37/08
USPC .................................. 502/211, 213, 314–316
See application file for complete search history.

(56) References Cited

U.S. PATENT DOCUMENTS

| | | | |
|---|---|---|---|
| 3,544,452 A | * | 12/1970 | Jaffe ...................... B01J 27/188 208/216 PP |
| 4,154,812 A | | 5/1979 | Sanchez et al. |
| 4,879,265 A | | 11/1989 | Simpson et al. |

(Continued)

FOREIGN PATENT DOCUMENTS

| | | |
|---|---|---|
| CN | 101330972 A | 12/2008 |
| CN | 102438745 A | 5/2012 |

(Continued)

OTHER PUBLICATIONS

Ferdous, et al., "A Series of NiMo/Al2O3 Catalysts Containing Boron and Phosphorus Part I. Synthesis and Characterization", Applied Catalysis A: General, vol. 260, No. 2, Apr. 2004, pp. 137-151.

(Continued)

*Primary Examiner* — Patricia L. Hailey
(74) *Attorney, Agent, or Firm* — Lerner, David, Littenberg, Krumholz & Mentlik, LLP

(57) ABSTRACT

Improved supported hydroprocessing catalysts, and their method of preparation useful for the hydrodesulfurization (HDS) and hydrodenitrogenation (HDN) of a petroleum feedstock, including a residuum hydrocarbon feedstock are disclosed. The Catalysts contain at least one Groups VIB metal component, at least one Group VIII metal component, and a phosphorus component, supported on a foraminous support such as alumina. The supported catalysts are characterized by a specific combination of properties, namely, the Group VIII metal to Phosphorous molar ratio, the Group VIII metal to Group VIB metal molar ratio, the phosphorous component to Group VIB component molar ratio and the median pore diameter. The resulting catalysts exhibit enhanced HDN without sacrificing to any significant degree the HDS activity.

12 Claims, No Drawings

(56) References Cited

U.S. PATENT DOCUMENTS

| | | | |
|---|---|---|---|
| 5,468,709 A | 11/1995 | Yamaguchi et al. | |
| 5,827,421 A | 10/1998 | Sherwood, Jr. | |
| 6,403,526 B1 | 6/2002 | Lussier et al. | |
| 7,265,075 B2* | 9/2007 | Tsukada | B01J 21/04 423/625 |
| 7,390,766 B1 | 6/2008 | Klein | |
| 7,560,407 B2 | 7/2009 | Klein | |
| 7,642,212 B2 | 1/2010 | Klein | |
| 8,969,242 B2* | 3/2015 | Klein | C10G 65/00 208/89 |
| 2004/0186013 A1* | 9/2004 | Iwata | B01J 23/88 502/208 |
| 2005/0266985 A1* | 12/2005 | Iwata | B01J 23/88 502/208 |
| 2007/0135300 A1 | 6/2007 | Kagami et al. | |
| 2009/0298677 A1 | 12/2009 | Radlowski et al. | |
| 2012/0037540 A1 | 2/2012 | Jansen et al. | |
| 2012/0205290 A1 | 8/2012 | Gabrielov et al. | |
| 2014/0174983 A1 | 6/2014 | Klein et al. | |
| 2015/0144532 A1 | 5/2015 | He et al. | |

FOREIGN PATENT DOCUMENTS

| | | |
|---|---|---|
| JP | S62197150 A | 8/1987 |
| JP | H0214745 A | 1/1990 |
| JP | 200042413 A | 2/2000 |
| JP | 200079343 A | 3/2000 |
| WO | 2011023668 A2 | 3/2011 |

OTHER PUBLICATIONS

Ferdous, et al., "A Series of NiMo/Al2O3 Catalysts Containing Boron and Phosphorus Part II. Hydrodenitrogenation and Hydrodesulfurization Using Heavy Gas Oil Derived from Athabasca Bitumen", Applied Catalysis A: General, vol. 260, No. 2, Apr. 2004, pp. 153-162.

Supplementary European Search Report for EP Application No. 16803960.0, dated Dec. 13, 2018.

Barrett EP, Joyner LG, Halenda PP. The determination of pore volume and area distributions in porous substances. I. Computations from nitrogen isotherms. Journal of the American Chemical society. Jan. 1951;73(1):373-80.

Brunauer S, Emmett PH, Teller E. Adsorption of gases in multimolecular layers. Journal of the American chemical society. Feb. 1938;60(2):309-19.

Catalyst Society of Japan, Catalyst Course, vol. 5 (Engineering 1), Catalyst Design, first published Dec. 10, 1985, Noma Koremichi.

Definition of "Reaction Rate Constant" as found on Wikipedia, downloaded Nov. 20, 2017, last updated Sep. 16, 2017 Retrieved from: https://en.wikipedia.org/w/index.php?title=Reaction_rate_constant&oldid=800957697.

Hydrotreatment—Science and Technology, published Oct. 20, 2000, ed. by Kabe T., IPC Company (Google Translation of p. 307).

International Search Report for Application No. PCT/US2016/32474 dated Aug. 17, 2016.

Search Report for Application No. 105116259 dated Jan. 5, 2017.

Setoyama, Katsumi and Takahashi, Satoshi, Introduction to Experimental Solid State Chemistry (XIII)* 8 Surface Area, Micropore Volume and Micropore Distribution (2)**, Gypsum & Lime No. 192(1984).

Petroleum Refining Processes, new version edited by The Japan Petroleum Institute (Public Interest Incorporated Associations) and published on Mar. 1, 2014, Kodansha Ltd, pp. 81-82.

Masaomi Amemiya el al., "About deterioration in hydrogenation refining catalyst at distillates treatment (First report) Deterioration in activity in vacuum gas oil desulfurization apparatus", Journal of The Japan Petroleum Institute, 43.(1). 52-58 (Jan. 2000).

Jun Fuchikami, "Practical series 'Petrochemistry and Catalysts' (III) Method for formulating desulfurization catalysts, produced catalysts III", Petrotech, The Japan Petroleum Institute (Incorporated associations), published on Jun. 1, 1994, vol. 17, No. 6, pp. 510-514.

Eiichi Kikuchi, et. al., "New Catalyst Chemistry", 2nd edition, Sankyo Shuppan Co., Ltd., published on Oct. 15, 2003, pp. 164-166.

2nd Supplementary Reasons for Invalidation from the Taiwanese Patent Office for Application 105116259N01 dated Nov. 9, 2018.

Reasons for Invalidation from the Taiwanese Patent Office for Application 105116259N01 dated Nov. 9, 2017.

Supplementary Reasons for Invalidation from the Taiwanese Patent Office for Application 105116259N01 dated Jun. 22, 2018.

Patentee's 2nd Rejoinder to Opposer's 2nd Supplementary Reasons for Invalidation filed Jan. 21, 2019.

Response to Grounds for Patent Invalidation Filed by Opposer filed Jan. 24, 2018.

Patentee's Claim Amendments and Remarks for Rejoinder to Opposer's Supplementary Reasons for Invalidation of TW1599401 filed Sep. 3, 2018.

4th Supplementary Reasons for Invalidation from the Taiwanese Patent Office for Application 105116259N01 dated Aug. 23, 2019.

Eiichi Kikuchi, et. al., "New Catalyst Chemistry", 2nd edition, Sankyo Shuppan Co., Ltd.; Toyko, published on Oct. 15, 2003, ISBN 4-7827-0368-6, pp. 174-176, 204-205.

Catalyst Preparation Chemistry, Satoshi Ozaki & Others—authors, published Mar. 1980 by Kodansha, Tokyo; ISBN 978-4-06-139340-0; pp. 252-255.

ASTM Designation D4284-03 Standard Test Method for Determining Pore Volume Distribution of Catalysts by Mercury Intrusion Porosimetry, pp. 421-427.

Patentee's Rejoinder in Response to Opposer's 4th Supplementary Reasons for Invalidation for Taiwan Patent Application No. 105116259; Patent No. 1599401 dated Oct. 24, 2019.

* cited by examiner

HIGH HDN SELECTIVITY HYDROTREATING CATALYST

CROSS-REFERENCE TO RELATED APPLICATION

The present application is a national phase entry under 35 U.S.C. § 371 of International Application No. PCT/US2016/032474 filed May 13, 2016, which claims priority from U.S. Provisional Patent Application No. 62/167,995, filed on May 29, 2015, the disclosures of which are hereby incorporated herein by reference.

FIELD OF THE INVENTION

The present invention relates to the catalytic hydroprocessing of heavy hydrocarbon oils used as feedstock in FCC processes. In particular, the present invention relates an improved hydrotreating catalyst having a higher selectivity for hydrodenitrogenation (HDN) at a given hydrodesulfurization (HDS) level and to a method for the preparation of the improved catalyst.

DEVELOPED UNDER JOINT RESEARCH AGREEMENT

The present invention was developed under a joint research agreement between JX Nippon Oil & Energy Corporation, having facilities at 6-3 Otemachi 2-chome, Chiyodaku, Tokyo 100-8162, Japan, and Advanced Refining Technologies L.L.C., having offices at 7500 Grace Drive, Columbia, Md.

BACKGROUND OF THE INVENTION

Fluid catalytic cracking plays an essential role in the conversion of high boiling point hydrocarbons to more valuable lighter hydrocarbons such as gasoline. There is a trend towards processing more economical, heavier feedstocks such as atmospheric resid rather than more traditional feedstocks such as vacuum gas oil. Before being fed to an FCC unit, however, these heavier feedstocks must be treated to remove contaminants detrimental to successful operation of an FCC process. Sulfur, nitrogen and metals (e.g., vanadium and nickel) all pose potential problems for FCC operation. Basic nitrogen compounds are particularly troublesome for FCC catalysts due to poisoning of acidic zeolite sites.

Hydroprocessing treatment to remove sulfur, nitrogen and metals typically consists of exposing the feedstock to a series of catalyst beds at elevated temperatures and pressures in the presence of hydrogen. The purpose of the initial catalyst bed is primarily the removal of metal containing compounds from the feedstock. This serves as protection for later catalyst beds, whose primary purpose is the removal of sulfur and nitrogen. These beds have limited tolerance for metals before deactivation occurs. This invention relates specifically to these later catalyst beds whose main purpose is sulfur and nitrogen removal. It should be noted that some metals will make it to these beds and that metals tolerance is still an important factor that can shorten catalyst life.

In practice, hydroprocessing operations target a specific sulfur level in the product. Reactor temperature is increased or decreased to hit this sulfur target. Even if a catalyst gives improved sulfur and nitrogen removal, in practice the reactor temperature would be decreased to hit the target sulfur level. If increased nitrogen removal is desired, it is advantageous to use a catalyst that is selective for nitrogen removal (i.e.—higher nitrogen removal versus sulfur removal ratio).

In the hydroprocessing process, hydrocarbon feedstocks are contacted with a hydroconversion catalyst in the presence of hydrogen at elevated pressure and temperature. Catalysts used in hydroprocessing processes generally comprise catalytically active metals from Groups VIB (Group 6) and Group VIII (Groups 8, 9 and 10) of The Periodic Table and are typically supported on a support, typically made predominately of alumina. The operating conditions are typically driven to maximize HDS, and typical operating conditions have included a reaction zone temperature of 300° C. to 500° C. a hydrogen partial pressure of 3 to 25 MPa, a hydrogen feed rate of 400 to 3000 normal liters of hydrogen gas per liter (N L/L) of oil feed, and a catalyst such as nickel or cobalt and molybdenum or tungsten on a predominately alumina support. However, since optimum HDN temperatures are not the same as optimum HDS temperatures, it is an advantage if the selectivity for HDN can be raised for a given HDS level of activity.

To this end, there remains a need to develop catalyst compositions which provide good hydrodesulfurization of heavy oil and residuum feedstocks while simultaneously providing improved HDN during a hydroprocessing process.

SUMMARY OF THE INVENTION

The present invention is based on the finding that by controlling certain catalyst properties such as the Group VIII metal to Phosphorous mole ratio, the Group VIII metal to Group VIB metal mole ratio, and the median pore diameter, enhanced HDN activity can be achieved for a given HDS activity.

In one aspect of the present invention, a supported catalyst having enhanced HDN selectivity is provided which comprises at least one metal containing catalyst component and at least one Phosphorous containing catalyst component, wherein the metal in the metal containing catalyst component is at least one selected from Group VIB of the Periodic Table of the Elements, at least one other metal selected from Group VIII of the Periodic Table of the Elements, and wherein said catalyst components are carried on a foraminous support, said catalyst being characterized as having:
   (a) a Group VIII metal component to Phosphorous component mole ratio of less than 0.60:1;
   (b) a Group VIII metal component to Group VIB metal component molar ratio of less than 0.45:1;
   (c) a phosphorous component to Group VIB metal component molar ratio of greater than 0.23:1; and
   (d) a median pore diameter of greater than 75 Å and less than 95 Å.

DETAILED DESCRIPTION OF THE INVENTION

Definitions

As used herein the following terms or phrases have the indicated meanings.

Reference to "nitrogen" is by way of exemplification of elemental nitrogen by itself as well as compounds that contain nitrogen. Similarly, a reference to "sulfur" is by way of exemplification of elemental sulfur as well as compounds that contain sulfur.

"Component" as applied to, for example, metals of the catalyst impregnating solution or catalyst per se refers to any compound or complex, including a salt, oxide, sulfide, or any intermediate form between oxide and sulfide of the metal in question.

"Carrier" and "support" are used interchangeably herein.

"Feedstocks" or petroleum feedstocks typically treated using processes that include catalysts of the present invention are often described in terms of being "heavy" or "light". The terms "light" and "heavy" with regard to petroleum fractions are used herein in their normal sense within the refining industry to refer respectively to relatively low and high boiling point ranges. Heavy Fuel Oils (HFOs) include both finished products (residual fuels) and the primary refinery streams from which they are blended. Members of the heavy fuel oil category are a diverse group of substances encompassing hydrocarbons with a wide range of molecular weights, carbon numbers (typically about C7 to about C50) and boiling points about 121° C. to 600° C. (about 250° F. to about 1112° F.). In addition to petroleum hydrocarbons they contain one or more heterocyclic compounds containing sulfur, nitrogen, and oxygen, and organo-metallic or metallic compounds. Finished heavy fuels (residual fuels) are products that comprise primarily the residuum of the refining process after virtually all of the higher-quality hydrocarbons have been distilled, cracked, or catalytically removed from crude oil feedstock. Substantially all (at least 90 vol. %) of hydrocarbon feed streams or feedstocks typically fall within the boiling point range between about 300° F. and 1050° F. and preferably between about 600° F. and 1000° F. A feedstock can comprise a mixture of petroleum fractions such as atmospheric and vacuum gas oils (AGO and VGO). Suitable feedstocks include heavy hydrocarbonaceous mineral or synthetic oil or a mixture of one or more fractions thereof. Thus, such known feedstocks as straight run gas oils, vacuum gas oils, demetallized oils, atmospheric residue, vacuum residue, deasphalted vacuum residue, solvent deasphalted, coker distillates, cat cracker distillates, shale oil, tar sand oil, coal liquids and the like and mixtures thereof are contemplated. A preferred feedstock will have a boiling point range starting at a temperature above about 500° C. (above about 932° F.) or more. Suitable feedstocks typically contain nitrogen, usually present as organonitrogen compounds in amounts between 1 ppm and less than 4.0 wt. %. The feedstock will normally also comprise sulfur-containing compounds sufficient to provide a sulfur content of less than 5 wt % preferably less than 4 wt %. The boiling point ranges of various product fractions recovered in any particular refinery will vary depending on such factors as the characteristics of the crude oil source, the refinery's local markets, product prices, etc.

"Group" or "Groups": Any reference to a Group or Groups of the Periodic Table of the Elements is preferably to the Group or Groups as reflected in the Periodic Table of Elements using the IUPAC system for numbering groups of elements as Groups 1-18. However, to the extent that a Group is identified by a Roman numeral according, for example, to the Periodic Table of the Elements as published in "Hawley's Condensed Chemical Dictionary" (2001) (the "CAS" system) it will further identify one or more Elements of that Group so as to avoid confusion and provide a cross-reference to the numerical IUPAC identifier.

"Median Pore Diameter is measured by nitrogen gas adsorption. Thus it corresponds to the median pore diameter calculated based on pore size distribution and is the pore diameter above which half of the pore volume lies. Median Pore Values reported herein are based on nitrogen desorption using the well-known calculation method described by E. P. Barrett, L. G. Joyner and P. P. Halenda ("BJH"), "The Determination of Pore Volume and Area Distributions in Porous Substances. I. Computations from Nitrogen Isotherms," J. Am. Chem. Soc., 1951, 73 (1), pp 373-380.

For purposes of the present invention, pore volume may be measured using nitrogen porosimetry.

"Surface area" refers herein to the specific surface area as determined by BET surface area analysis. The BET method of measuring surface area has been described in detail by Brunauer, Emmett and Teller in J. Am. Chem. Soc. 60 (1938) 309-319, which is incorporated herein by reference.

All morphological properties involving weight, such as pore volume, PV (cc/g) or surface area, (SA) ($m^2$/g) can be normalized to a "metals" free basis in accordance with procedures well-known in the art. However, the morphological properties reported herein are on an "as-measured" basis without correcting for metals content.

The present invention generally provides catalyst compositions comprised of catalytically active metals or precursor metal compounds of metals of Groups VIII and Group VIB of The Periodic Table, and phosphorous compounds, supported on a foraminous support, preferably comprised of alumina.

Carriers or supports useful in the present invention are generally identified as "foraminous" carriers; for purposes of the present invention such carriers will be generally understood to comprise many holes, perforations and/or porosity. Examples of suitable foraminous carrier materials include silica, silica gel, silica-alumina, alumina, titania, titania-alumina, zirconia, boria, terrana, kaolin, magnesium silicate, magnesium carbonate, magnesium oxide, aluminum oxide, precipitated aluminum oxide, activated alumina, bauxite, kieselguhr, pumice, natural clays, synthetic clays, cationic clays or anionic clays such as saponite, bentonite, kaolin, sepiolite or hydrotalcite, and mixtures thereof. Preferred foraminous carrier materials are silica, silica-alumina, alumina, titania, titania-alumina, zirconia, bentonite, boria, and mixtures thereof; silica, silica-alumina, and alumina are especially preferred. Alumina for use as a carrier can be prepared, for example, by converting an alumina precursor in pseudoboehmite form, into a preferred form for use as a carrier material, gamma-alumina, typically using calcination.

Alumina powders are typically prepared in a batch process in which the alumina is precipitated under controlled reactant concentrations and reaction conditions, including temperature, time, pH, reactant feed rates and the like. Such processes are generally known in the art (see, for example, U.S. Pat. No. 4,154,812, Sanchez et al., U.S. Pat. No. 6,403,526, Lussier et al., and the patents cited therein, the disclosures of which are incorporated herein by reference). The surface area of alumina powder of the invention ranges from about 180 m2/g to about 300 m2/g. In another embodiment of the invention, the surface area of the alumina powder ranges from about 220 m2/g to about 280 m2/g.

In one embodiment, the total pore volume of the powder can range from about 0.5 cc/g to about 1.5 cc/g. In another embodiment of the invention, the total pore volume of the powder can range from about 0.6 cc/g to about 0.8 cc/g.

Dried alumina powder or washed alumina filter cake, or both, and water are mixed or commingled to provide what is referred to as a damp or wet mix or a dough. Optionally, an acidic or basic aqueous medium, such as an aqueous solution of an acid or acid salt, can also be added to the mixture. When an acid is included, preferably an aqueous solution of a monobasic mineral acid is commingled with water and the alumina to provide the mix. Hydrochloric acid and other strong monobasic acids, including nitric acid may be used; nitric acid is preferred. Other useful acids include organic acids such as acetic acid, formic acid, propionic acid and the like. Alternatively, an aqueous base such as ammonium hydroxide can be used. In addition, as disclosed in the art, recycled, calcined product fines in an amount of up to about 25 percent by weight of total alumina may advantageously be added during this step.

The mixture resulting from the previous step is referred to as a damp mix. This mix is used as described below as the source of alumina that is formed into the carrier, such as in the form of pills or other shapes, as described elsewhere herein. This step is conveniently conducted by extruding the damp mix, which is typically followed by drying and calcination of the pills.

Catalysts in accordance with the invention are prepared by contacting the formed support, preferably alumina support with an aqueous solution of at least one catalytically active metal or precursor metal component to uniformly distribute the desired metal component on the support. Preferably, the metals and/or metal precursors are distributed uniformly throughout the pores of the support. In a preferred embodiment of the invention, the catalysts are prepared by impregnation of the catalyst supports to incipient wetness with an aqueous solution of the desired catalytically active metal or precursor compound.

Catalytically active metal and/or precursor metals compounds useful to prepare the catalyst composition of the invention, include, but are not limited to metals or compounds of metals selected from the group consisting of Group VIB (also referred to as Group 6) of The Periodic Table, and one or more members of Group VIII (also referred to herein as Groups 8, 9 and 10, preferably Groups 9 and 10) of The Periodic Table. Group VIB metals include, but are not limited to, molybdenum and tungsten with molybdenum being preferred over tungsten. Group VIII metals include, but are not limited to, cobalt and nickel with nickel being preferred over cobalt.

In one embodiment of the invention the combination of nickel and molybdenum catalytic agents are preferred. In another embodiment of the invention, the resulting catalyst comprises Mo concentrations in the range of about 5.0 to about 15.0 wt % (e.g., 6.0 to about 12 w %) and Ni concentrations in the range of about 1.0 to about 6.0 wt % (e.g., 1 to 4 wt %), said wt % being based on the total weight of the catalyst composition.

In one embodiment concentrations of phosphorous in the resulting catalyst can be in the range of about 0.5 to about 3.0 wt % (e.g., 1.0 to about 3 wt %) of phosphorous, based on the weight of the total catalyst composition.

Suitable precursor metal compounds of the Group VIII or Group VIB metals include, but are not limited to, metallic salts such as nitrates, acetates and the like. Suitable precursor metal compounds of Group VIB metals include, but are not limited to, ammonium molybdate, molybdic acid, molybdenum trioxide, and the like. Suitable Group VIII metal compounds include but are not limited to cobalt nitrate, nickel acetate, and the like.

Catalytically active metals contemplated for use with the supports of the present invention are in one embodiment used in the form of sulfides of the metals but in another embodiment may be made and sold as oxides and converted to sulfides before use.

Catalyst compositions of the invention comprise a phosphorus component. In this case, the impregnating solution may also contain a phosphorus compound, e.g. phosphoric acid, phosphates, and the like, in addition to the desired catalytically active metals or precursor metal compounds.

The particular amount of the Group VIB metal component, Group VIII metal component and phosphorous, is selected to achieve the desired and hereafter described Group VIII metal to P molar ratio; Group VIII metal to Group VIB metal molar ratio, and P to Group VIB metal molar ratio.

As will be clear to a person skilled in the art, there is a wide range of variations on the impregnating method used to support the catalytic active metals on the catalyst supports. It is possible to apply a plurality of impregnating steps or the impregnating solutions may contain one or more of the component or precursors to be deposited, or a portion thereof. Instead of impregnating techniques, dipping methods, spraying methods and the like can be used. In the case of multiple impregnations, dipping, and the like, drying and/or calcining may be carried out as between steps.

Preferably, hydroprocessing catalysts, can be produced using the carrier support and catalytically active metal components by various alternative methods, including by pre-impregnation, or by post-impregnation.

"Pre-impregnated" catalyst refers to a catalyst in which the metals-containing solution or solutions are added before the foraminous catalyst carrier is shaped. "Post-impregnated" catalyst refers to a catalyst in which the metals-containing solution or solutions are added after the foraminous catalyst carrier is shaped. The foraminous catalyst carrier can be calcined before or after shaping of the catalyst particle. Post-impregnation is preferred wherein calcined shaped carrier is impregnated and then calcined again.

More specifically, in one pre-impregnation preparation method, alumina and catalytic metal precursors, water, and additives such as extrusion aids, peptizing chemicals, and the like, are co-mixed and extruded into shaped structures. The metal-containing shaped structures are then dried and calcined to produce the final catalyst.

In a post-impregnation method, alumina powder is mixed with water and then extruded to form a shaped catalyst support. The support is dried and calcined, and metal precursors are impregnated onto the support. The impregnated shaped structures are then dried and calcined to provide finished products.

Extruded shaped supports in accordance with the invention may have various geometric forms, such as cylinders, rings, and symmetric and/or asymmetric polylobes, for instance, tri- or quadrulobes. Nominal sizes of the extrudates may vary. The diameter usually ranges from about 0.8 mm to about 3 mm, and the length ranges from about 1 mm to about 30 mm. In one embodiment of the invention, the diameter ranges from about 1.1 mm to about 1.2 mm and the length ranges from about 1 mm to about 6 mm. As will be understood by one skilled in the catalyst arts, catalyst particles produced from the supports will have a similar size and shape as the support.

More specifically, suitable catalysts can be prepared by impregnating a catalyst carrier, preferably an alumina carrier exhibiting the properties described herein, using stabilized aqueous compositions and methods as described in U.S. Pat. Nos. 7,390,766, 7,560,407 and 7,642,212 (D. P. Klein, assigned to Advanced Refining Technologies), the disclosure of which is incorporated herein to the extent permitted. A suitable method and composition comprises adding to a suitable quantity of water: (A) at least one substantially water insoluble Group VIII metal component; and (B) at least one substantially water-soluble, phosphorous-containing acidic component in an amount insufficient to cause dissolution of the at least one Group VIII metal component, so as to produce a slurry typically at ambient temperature, and combining the slurry with: (C) at least one Group VIB metal component; and (D) mixing the combination of (A), (B) and (C) and heating the mixture, for a time and to a temperature sufficient for (A), (B) and (C) to form a solution; and (E) adding an additional amount of water, if required, to obtain solution concentrations of at least one Group VIII metal, the at least one Group VIB metal and phosphorous useful for impregnating the carriers; wherein Group VIB and Group VIII refer to Groups of the periodic table of the elements.

Advantageously, the support after impregnation and calcination to form the catalyst typically possess specific properties of surface area, pore volume and pore volume distribution.

The surface area of the shaped catalyst in one embodiment can range from about 150 to about 350 m2/g. In another embodiment of the invention, the surface area of the supports can range from about 200 to about 320 m2/g.

In one embodiment, the shaped catalyst can have a total pore volume in the range of from about 0.6 to about 1 cc/g. In another embodiment, the total pore volume of the supports can range from about 0.65 to about 0.9 cc/g.

In one embodiment the median pore diameter of the shaped catalyst will be greater than 75 Å and less than 95 Å and can range from about 78 to about 92 Å, preferably from about 80 to about 90 Å, and most preferably from about 85 to about 90 Å.

In various embodiments the molar ratio of the at least one Group VIII metal component to Group VIB metal component can be less than about 0.45:1, and in another embodiment less than about 0.43:1, and in another embodiment less than about 0.42:1 and in one embodiment can range from about 0.05:1 to about 0.44:1, and in another embodiment from about 0.10:1 to about 0.43:1, and in another embodiment from about 0.20:1 to about 0.40:1. The amount of the at least one Group VIII metal component is selected sufficient to promote the catalytic effect of the Group VIB metal component.

The concentration of the Group VIB metal component, expressed as the oxide, in one embodiment is at typically from about 1 to about 15 wt % (e.g. 5 to about 12 wt %), based on the weight of the composition;

The amount of phosphorous-containing acidic component is sufficient to provide a Group VIII metal component to phosphorous-containing acidic component molar ratio of less than about 0.60:1, in another embodiment less than about 0.55:1, and in another embodiment less than about 0.53:1, and in one embodiment such ratio can range typically from about 0.05:1 to about 0.59:1, in another embodiment from about 0.10:1 to about 0.53:1, and in another embodiment from about 0.25:1 to about 0.50:1.

The phosphorous-containing acidic component to Group VIB metal component molar ratio in one embodiment is greater than about 0.23:1, in another embodiment greater than about 0.40:1, and in another embodiment greater than about 0.50:1, and such ratio can range in one embodiment from about 0.24:1 to about 0.95:1, in another embodiment from about 0.65:1 to about 0.90:1, and in another embodiment from about 0.70:1 to about 0.85:1.

Drying conditions of the supports treated with aqueous solutions of the catalytically active metal/s or precursor compounds, can range in one embodiment from about 100° C. to about 200° C. for about 30 minutes to about 2 hours.

Calcination is conducted at a temperature and time sufficient to convert at least part, preferably all, of the metal components or precursors to the oxide form, which conditions can the range in one embodiment from about 300° C. to about 900° C., in another embodiment about 450° C. to about 650° C., for in one embodiment from about 0.5 to about 3 hours, and in another embodiment from about 0.5 to about 2 hours.

Catalysts according to the invention exhibit an increased catalytic activity toward HDN, and an acceptable metals tolerance during hydroprocessing, e.g., hydrotreating, of feedstock, preferably residuum feedstock, at a given HDS catalyst activity. The catalytic process of the present invention is basically directed to residuum feedstocks as opposed to gas-oil feedstocks. Residua typically have greater than 10 ppm metals, whereas gas-oils nearly always have less than 10 ppm metals content. Thus, typical feedstocks useful in the present invention are "heavy oils" which include, but are not limited to, crude oil atmospheric distillation column bottoms (reduced crude oil or atmospheric column residuum), or vacuum distillation column bottoms (vacuum residua). The metals are believed to be present as organometallic compounds, possibly in porphyrin or chelate-type structures, but the concentrations of metals referred to herein is calculated as weight parts per million (wppm) or wt % pure metal.

In one embodiment, the catalyst of the present invention is suitable for treating hydrocarbon feeds containing in one embodiment less than 4 wt % (e.g., 0.0001 to about 3.9 wt %) nitrogen, in another embodiment greater than about 0.001 wt %, in another embodiment greater than about 0.01 wt %, in another embodiment greater than about 0.0.1 wt %, in another embodiment greater than about 1 wt %, and in another embodiment greater than about 2 wt % nitrogen, and such feed can range in nitrogen content from about 0.001 to about 3.9 wt %, in another embodiment 0.01 to about 3 wt % nitrogen. The source of the nitrogen in the feed may be attributable to nitrogen-containing compounds such as for example, imidazoles, pyrazoles, thiazoles, isothiazoles, azathiozoles, and the like.

The catalysts of the present invention are suitable for treating hydrocarbon feeds containing, in one embodiment less than 5 wt % sulfur, in another embodiment greater than about 0.001 wt %, in another embodiment greater than about 0.01 wt %, in another embodiment greater than about 0.1 wt %, sulfur, and such feed can range in sulfur content from about 0.0001 to about 4.9 wt %, in another embodiment 0.001 to about 4.5 wt % sulfur. Examples of sulfur compounds in feed include but are not limited to heterocyclic compounds containing sulfur such as benzothiophene, alkylbenzothiophene, multi-alkylbenzothiophene and the like, dibenzothiophene (DBT), alkyldibenzothiophene, multi-alkyldibenzothiophene, such as 4,6-dimethyldibenzothiophene (4,6-DMDBT)) and the like.

Catalysts prepared according to the present invention can be used in virtually all hydroprocessing processes to treat a plurality of feeds under wide-ranging reaction conditions, generally, for example, at temperatures in the range of about 200° to about 500° C., hydrogen pressures in the range of about 0.5 to 30 MPa, and liquid hourly space velocities (LHSV) in the range of about 0.05 to 10 h−1. The term "hydroprocessing" can encompass various processes in which a hydrocarbon feed is reacted with hydrogen at elevated temperature and elevated pressure (hydroprocessing reaction conditions), including hydrogenation, hydrodesulfurization, hydrodenitrogenation, hydrodemetallization, hydrodearomatization, hydrocracking, and hydrocracking under mild pressure conditions, which is also referred to as mild hydrocracking.

More specifically, "hydroprocessing" as the term is employed herein means oil refinery processes for reacting petroleum feedstocks (complex mixtures of hydrocarbon present in petroleum) with hydrogen under pressure in the presence of a catalyst to lower: (a) the concentration of at least one of sulfur, contaminant metals, nitrogen, and Conradson carbon, present in said feedstock, and (b) at least one of the viscosity, pour point, and density of the feedstock. Hydroprocessing includes hydrocracking, isomerization/dewaxing, hydrofinishing, and hydrotreating processes which differ by the amount of hydrogen reacted and the nature of the petroleum feedstock treated.

Hydrofinishing is typically understood to involve the hydroprocessing of hydrocarbonaceous oil containing predominantly (by weight of) hydrocarbonaceous compounds in the lubricating oil boiling range ("feedstock") wherein the feedstock is contacted with solid supported catalyst at conditions of elevated pressure and temperature for the purpose of saturating aromatic and olefinic compounds and removing nitrogen, sulfur, and oxygen compounds present within the feedstock, and to improve the color, odor, thermal, oxidation, and UV stability, properties of the feedstock.

Hydrocracking is typically understood to involve the hydroprocessing of predominantly hydrocarbonaceous compounds containing at least five (5) carbon atoms per molecule ("feedstock") which is conducted: (a) at superatmospheric hydrogen partial pressure; (b) at temperatures typically below 593.3° C. (1100° F.); (c) with an overall net chemical consumption of hydrogen; and (d) in the presence of a solid supported catalyst containing at least one (1) hydrogenation component.

Hydrotreating is typically understood to involve the hydroprocessing of predominantly hydrocarbonaceous compounds containing at least five carbon atoms per molecule ("feedstock") for the desulfurization and/or denitrification of said feedstock, wherein the process is conducted: (a) at superatmospheric hydrogen partial pressure; (b) at temperatures typically below 593.3° C. (1100° F.); (c) with an overall net chemical consumption of hydrogen; and (d) in the presence of a solid supported catalyst containing at least one hydrogenation component.

A hydroprocessing process employing the catalyst compositions of this invention may be carried out under hydrodesulfurization process conditions of the type used in hydrotreating in an apparatus whereby an intimate contact of the catalyst composition with said feedstock and a free hydrogen containing gas is achieved, to produce a hydrocarbon-containing fraction having a reduced level of sulfur. In a preferred embodiment of the invention, the hydroprocessing process is carried out using a fixed catalyst bed. The hydroprocessing process can be carried out as a batch process or a continuous process using one or more fixed catalyst beds or a plurality of fixed bed reactors in parallel or in series.

In various embodiments, the reaction conditions can be selected to be effective hydroprocessing conditions. One possible type of effective hydroprocessing conditions can be conditions suitable for hydroprocessing of a feed prior to fluid catalytic cracking. The hydroprocessing catalyst of the present invention can be included as at least a portion of the hydroprocessing catalyst used for the hydroprocessing process. Hydroprocessing can be performed by exposing a feed to a catalyst in one or more reactors and/or stages, with each reactor and/or stage possibly including one or more catalyst beds. Optionally, one or more intermediate separations and/or quenches may be included between successive reactors, stages, or beds during the hydroprocessing. Intermediate quenches can be used, for example, to control reaction temperatures that may rise, due to the exothermic nature of many reactions occurring during hydroprocessing. Intermediate separations could be used, for example, to reduce the concentration of $H_2S$ and/or $NH_3$ generated in the reaction system during hydroprocessing.

More specifically, in a hydroprocessing process involving multiple beds of hydroprocessing catalyst, at least a portion of one bed can comprise a catalyst of the present invention. The amount of the hydroprocessing catalyst of the present invention can correspond to at least about 10% of a bed, for example at least about 25% of a bed, at least about 50% of a bed, at least one entire bed, or at least multiple entire beds within a hydroprocessing reaction system. The catalyst of the present invention can be included at any convenient location within the hydroprocessing reactors, stages, and/or beds, preferably toward the downstream end of the hydroprocessing process, for example in at least about the latter half of the catalyst to which a feedstock is exposed.

Typical hydrodesulfurization process conditions useful include, but are not limited to, temperatures between about 300° and about 500° C. (e.g., 350 to about 450° C.), hydrogen partial pressures between about 3 and about 25 MPa (e.g., about 5 to about 20 MPa, more preferably about 8 to about 18 MPa), $H_2$:oil ratios between about 400 and about 3000 N L/L (e.g., 500 to about 1800 N L/L), and space velocities ($hr^{-1}$) between about 0.1 and about 3.0 (e.g., 0.2 to about 2). In one embodiment, the operating conditions for a hydrocarbon feedstock desulfurization process include a reaction zone temperature of about 371° C. to about 388° C., a hydrogen pressure of about 13.8 to about 15.8 MPa, and a hydrogen feed rate of about 880 to about 1300 normal liters per liter of oil feed. At these HDS conditions one will also achieve enhanced HDN selectivity.

In various embodiments, process conditions can be selected to effectively hydroprocess a relatively high nitrogen content feedstock. Conditions can be selected to achieve one or more desired product characteristics. For example, the hydroprocessing conditions can be selected to achieve a sulfur content of about less than about 0.10 w %, in another embodiment less than 0.05 wt % or less, for example about 500 wppm or less, about 350 wppm or less, or about 250 wppm or less. Additionally or alternately, the sulfur content can be reduced to about 100 wppm or more, for example about 200 wppm or more or about 500 wppm or more. These sulfur levels can allow the hydroprocessed effluent to be used as an input for a fluid catalytic cracking process. The desired nickel and vanadium, content in the hydroprocessed oil in one embodiment is for each metal 10 wppm or less, in another embodiment 5 wppm or less.

In addition or alternately to the sulfur content, the hydroprocessing conditions can be selected to achieve a nitrogen level of about 1200 wppm or less, for example about 1000 wppm or less, about 900 wppm or less, about 750 wppm or less, or about 500 wppm or less. Additionally or alternately, the nitrogen content can be reduced to about 100 wppm or more, for example about 200 wppm or more or about 500 wppm or more.

To further illustrate the present invention and the advantages thereof, the following specific examples are given. The examples are given as specific illustrations of the claimed invention. It should be understood, however, that the invention is not intended to be limited to the specific details set forth in the Examples.

All parts and percentages in the examples as well as the remainder of the specification that refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES AND COMPARATIVE EXAMPLES

A series of four catalysts were prepared and tested for their hydroprocessing activity. The catalysts are composed of metals selected from Mo, Ni, Co, and P as summarized in Table 1, in various quantities on an alumina support (Runs 1 to 4) and are compared to a series of reference catalysts (Runs 5 to 8). The catalysts were tested as described in Part E. The Feedstock was as described in Part D. Reaction conditions were as shown in Part E. Table 3 shows the properties of each catalyst and Table 4 shows the reaction performance of each catalyst. The rate constants for each reaction (HDS, HDN and hydrodemetallization (HDM)) are based on the results at 360, 380 and 400° C. and assume first order reaction kinetics. HDN selectivity is calculated as kHDN/kHDS. Removal of basic nitrogen is calculated from measured feed and product basic nitrogen contents. Metals tolerance is calculated as the time it takes for HDS activity to fall to 20% of its initial activity. The catalysts of Runs 1 to 4 are catalysts of this invention while the catalysts of Runs 5 to 8 are provided as comparative references. Results are presented as percentages relative to the reference Run 8 performance Run 4 shows the highest HDN selectivity.

Part A:

A commercial alumina powder was prepared from aluminum sulfate and sodium aluminate by techniques well known in the art. The resulting powder had the following properties:

TABLE 1

| Property | |
|---|---|
| Al$_2$O$_3$ wt % | >95 |
| Na$_2$O wt % | 0.05 |
| SO$_4$ w % | 1.5 |
| Av Part. Size um | 15 |
| Surface Area m$^2$/g | 350 |

Part B:

The alumina described in Part A was mixed with nitric acid and water for 90 min into a wet mix. This wet mix was then extruded into asymmetrical quadrilobe shaped extrudates (nominal diameter 0.05"). The extrudates were dried overnight at 110° C. before being calcined at 530° C. for 90 min in 8 liter per minute of air flow.

Part C:

Eight different samples of calcined Alumina extrudate prepared as described in Part B were impregnated with various aqueous metal solutions containing metals selected from Mo, Ni, Co, and P as shown in Table 3. The aqueous solution was prepared using molybdenum trioxide, nickel carbonate and phosphoric acid in water. The extrudates were impregnated in two steps. During the first step, half of the final Mo, Ni and P were impregnated onto the support. The resulting wet extrudates were dried at 130° C. for 16 hours in a static bed. The dried extrudates were then impregnated a second time with the remaining Mo, Ni and P sufficient to reach the wt %'s listed in Table 3 Runs 1 to 8. These wet extrudates were dried at 130° C. for 3 hours.

The dried extrudates from each run were then calcined at 500° C. for 30 min in 8 liter per minute of air flow. Each finished catalyst was designated by the Run number shown in Table 3 and contained the wt percentages of molybdenum, nickel, cobalt and phosphorous reported therein. These catalysts were used to treat a Feedstock.

Part D:

The Feedstock that was treated in Runs 1 to 8 was a (50/50) mixture of atmospheric residue oil and solvent deasphalted oil, with each having the following properties as shown in Table 2.

TABLE 2

| Property | Atmospheric Residue Oil | Deasphalted Oil |
|---|---|---|
| S Content (wt %) | 2.9 | 4.2 |
| V Content (wppm) | 40 | 29 |
| Ni Content (wppm) | 15 | 9 |
| Asphaltene Content (wt %) | 3.0 | 0.2 |
| Density (g/cc3) at `15° C. | 0.962 | 1.004 |
| Kinematic Viscosity (mm2/s) at 100° C. | 30.5 | 419 |
| Carbon Residue Content (wt %) | 9.0 | 15.5 |
| Nitrogen Content (w %) | 0.154 | 0.182 |
| Basic Nitrogen Content (wt %) | 0.052 | 0.062 |

Part E:

A fixed bed reactor setup using 100 cc of a demetallization catalyst in the first stage and 100 cc of each hydroprocessing catalyst described in connection with Runs 1 to 8 in the second stage. As the demetallization bed catalyst for all the Runs (average pore diameters are 18 nm and pore volume 0.87 ml/g) an alumina support containing 2.7 w % molybdenum was used to remove a part for metal from the feedstock.

The Feedstock was passed through the fixed bed reactor to contact fresh demetallization and hydroprocessing catalyst for each Run under the following conditions:

Hydrogen/oil ratio: 1000 L/L

LHSV: 0.44 h$^{-1}$

Hydrogen partial pressure: 14.4 MPa

Reaction temperatures for both the HDM and HDS stages: 360, 380 and 400° C. at reactions times at each temperature of 68, 45, and 45 hrs respectively.

Analysis of sulfur, nickel, vanadium, and nitrogen content was conducted on the treated oil. The activity result is shown in Table 4. Basic nitrogen removal was computed using the basic nitrogen concentration in the treated Feedstock at the 380° C. reaction temperature.

TABLE 3

| Catalyst Properties | | | | | | | | | |
|---|---|---|---|---|---|---|---|---|---|
| Run No | | 1 | 2 | 3 | 4 | 5 | 6 | 7 | 8 |
| Catalyst Properties | | catalyst A | catalyst B | catalyst C | catalyst D | catalyst E | catalyst F | catalyst G | catalyst H |
| Mo | (wt %) | 8 | 10 | 8 | 10 | 8 | 12 | 12 | 8 |
| Ni | (wt %) | 2 | 2.5 | 1.5 | 2 | 0.65 | 3 | 2.7 | 2.2 |
| Co | (wt %) | 0 | 0 | 0 | 0 | 1.35 | 0 | 0.8 | 0 |
| P | (wt %) | 2 | 2.5 | 2 | 2.5 | 0.6 | 2.5 | 1.4 | 0 |
| Group 8 metal/Group 6 metal | (mol/mol) | 0.4:1 | 0.4:1 | 0.31:1 | 0.32:1 | 0.4:1 | 0.4:1 | 0.49:1 | 0.45:1 |
| P/Group 6 metal | (mol/mol) | 0.775:1 | 0.775:1 | 0.775:1 | 0.775:1 | 0.232:1 | 0.646:1 | 0.362:1 | 0 |
| Group 8 metal/P | (mol/mol) | 0.52 | 0.52 | 0.40 | 0.41 | 1.72 | 0.62 | 1.35 | — |
| Median Pore Diameter | (Å) | 82 | 82 | 82 | 82 | 85 | 75 | 60 | 95 |

TABLE 4

| Reaction Performance | | | | | | | | | |
|---|---|---|---|---|---|---|---|---|---|
| Run No | | 1 | 2 | 3 | 4 | 5 | 6 | 7 | 8 |
| | | catalyst A | catalyst B | catalyst C | catalyst D | catalyst E | catalyst F | catalyst G | catalyst H |
| kHDS | % | 110 | 117 | 87 | 107 | 133 | 116 | 133 | 100 |
| kHDN | % | 167 | 206 | 161 | 203 | 118 | 189 | 223 | 100 |
| kHDM | % | 85 | 78 | 70 | 75 | 88 | 84 | 51 | 100 |
| Removal of basic nitrogen @ 380° C. | % | 23 | 30 | 19 | 32 | 11 | 26 | 28 | 5 |
| HDN selectivity | % | 152 | 176 | 185 | 190 | 89 | 163 | 168 | 100 |
| Relative metal tolerance | % | 58 | 50 | 58 | 50 | 67 | 33 | 17 | 100 |

As can be seen from the results of Table 4 Except for the catalyst of Run 7, the catalysts of Runs 5 through 8 exhibited lower HDN selectivities relative to the catalysts of Runs 1 to 4. The catalyst of Run 4 exhibited the highest HDN selectivity. However the catalyst of Run 7 exhibited very poor metals tolerance compared to the other runs. Low metal tolerance corresponds to short catalyst life.

Alternative Embodiments

The following enumerated paragraphs illustrate various and alternative embodiments of the present invention.

A. A supported catalyst comprising at least one metal containing catalyst component and at least one Phosphorous containing catalyst component, wherein the metal in the metal containing catalyst component is least one selected from Group VIB of the Periodic Table of the Elements, at least one other one metal selected from Group VIII of the Periodic Table of the Elements, and wherein said catalyst components are carried on a foraminous support, said catalyst being characterized as having:
  (a) a Group VIII metal component to Phosphorous component molar ratio of less than 0.60:1;
  (b) a Group VIII metal component to Group VIB metal component molar ratio of less than 0.45:1;
  (c) a phosphorous component to Group VIB metal component molar ratio of greater than 0.23:1; and
  (d) a median pore diameter of greater than 75 Å and less than 95 Å.

B. The catalyst of the embodiment of paragraph A. wherein:
  (a) the Group VIII metal component to Phosphorous component molar ratio is from about 0.05:1 to about 0.59:1;
  (b) the Group VIII metal component to Group VIB metal component molar ratio is from about 0.05 to about 0.44:1;
  (c) the phosphorous component to Group VIB metal component molar ratio is from about 0.24:1 to about 0.95:1;
  (d) the median pore diameter is from about 78 to about 92 Å; and
  (e) the support comprises alumina.

C. The catalyst of the embodiment of paragraph B. wherein:
  (a) the Group VIII metal is selected from cobalt, nickel and mixtures thereof; and
  (b) the Group VIB metal is selected from chromium, tungsten and molybdenum and mixtures thereof.

D. The catalyst of the embodiment of paragraph A., wherein the surface area of the catalyst from about 150 to about 350 m$^2$/g, and the total pore volume of the support is from about 0.5 to about 1.1 cc/g.

E. A method for preparing a catalyst having a high HDN selectivity during a the hydroprocessing of a feedstock, which method comprises impregnating a foraminous support with an aqueous solution containing at least one metal containing catalyst component and at least one Phosphorous containing catalyst component, wherein the metal in the metal containing catalyst component is least one selected from Group VIB of the Periodic Table of the Elements, at least one other metal in the metal containing catalyst component is selected from Group VIII of the Periodic Table of the Elements, said components being thermally decomposable to the metal oxides, and thereafter drying and calcining the resulting impregnated support to provide a supported catalyst, said supported catalyst being characterized as having:

(a) a Group VIII metal component to Phosphorous component molar ratio of less than 0.60;
(b) a Group VIII metal component to Group VIB metal component molar ratio of less than 0.45;
(c) a phosphorous component to Group VIB metal component molar ratio of greater than 0.23; and
(d) a median pore diameter of greater than 75 Å and less than 95 Å.

F. The method of the embodiment of paragraph F. wherein:
(a) the Group VIII metal component to Phosphorous component molar ratio is from about 0.05:1 to about 0.59:1;
(b) the Group VIII metal component to Group VIB metal component molar ratio is from about 0.05 to about 0.44:1;
(c) the phosphorous component to Group VIB metal component molar ratio is from about 0.24:1 to about 0.95:1;
(d) the median pore diameter is from about 78 to about 92 Å; and
(e) the support comprises alumina.

G. The method of the embodiment of paragraph F. wherein:
(a) the Group VIII metal is selected from cobalt, nickel and mixtures thereof; and
(b) the Group VIB metal is selected from chromium, tungsten and molybdenum and mixtures thereof.

H. The catalyst of the embodiment of paragraph A., wherein the surface area of the catalyst is from about 150 to about 350 m²/g, and the total pore volume of the support is from about 0.5 to about 1.1 cc/g.

The invention claimed is:

1. A supported catalyst comprising at least one metal containing catalyst component and at least one phosphorous containing catalyst component, wherein the metal in the metal containing catalyst component is least one selected from Group VIB of the Periodic Table of the Elements, at least one other one metal selected from Group VIII of the Periodic Table of the Elements, and wherein said catalyst components are carried on a foraminous support, said catalyst being characterized as having:
(a) a Group VIII metal component to Phosphorous component molar ratio of less than 0.60:1;
(b) a Group VIII metal component to Group VIB metal component molar ratio of less than 0.45:1;
(c) a phosphorous component to Group VIB metal component molar ratio from about 0.24:1 to 0.775:1; and
(d) a median pore diameter of from about 80 Å to about 90 Å;
wherein the foraminous support is selected from the group consisting of silica, silica-alumina, alumina, titania, titania-alumina, zirconia, bentonite, boria, and mixtures thereof.

2. The catalyst of claim 1 wherein:
(a) the Group VIII metal component to Phosphorous component molar ratio is from about 0.05:1 to about 0.59:1;
(b) the Group VIII metal component to Group VIB metal component molar ratio is from about 0.05 to about 0.44:1;
(c) the phosphorous component to Group VIB metal component molar ratio is from about 0.24:1 to 0.775:1; and
(d) the support comprises alumina.

3. The catalyst of claim 2 wherein:
(a) the Group VIII metal is selected from cobalt, nickel and mixtures thereof; and
(b) the Group VIB metal is selected from chromium, tungsten and molybdenum and mixtures thereof.

4. The catalyst of claim 1, wherein the surface area of the catalyst is from about 150 to about 350 m²/g, and the total pore volume of the support is from about 0.5 to about 1.1 cc/g.

5. The catalyst of claim 1, wherein the surface area of the catalyst is from about 150 to about 350 m²/g, and the total pore volume of the support is from about 0.5 to about 1.1 cc/g.

6. The catalyst of claim 1 exhibiting a combination of hydrodenitrogenation (HDN) selectivity greater than 152% and relative metals tolerance of greater than 50%, wherein HDN selectivity is calculated as the ratio of the rate constant for hydrodenitrogenation to the rate constant for hydrodesulfurization (HDS), kHDN/kHDS, and metals tolerance is calculated as the time it takes for HDS activity to fall to 20% of its initial activity.

7. A method for preparing a supported catalyst having a high hydrodenitrogenation (HDN) selectivity during hydroprocessing of a feedstock, which method comprises impregnating a foraminous support with an aqueous solution containing at least one metal containing catalyst component and at least one phosphorous containing catalyst component, wherein the metal in the metal containing catalyst component is least one selected from Group VIB of the Periodic Table of the Elements, at least one other metal in the metal containing catalyst component is selected from Group VIII of the Periodic Table of the Elements, said components being thermally decomposable to the metal oxides, and thereafter drying and calcining the resulting impregnated support to provide a supported catalyst, said supported catalyst being characterized as having:
(a) a Group VIII metal component to Phosphorous component molar ratio of less than 0.60;
(b) a Group VIII metal component to Group VIB metal component molar ratio of less than 0.45;
(c) a phosphorous component to Group VIB metal component molar ratio of from about 0.24:1 to 0.775:1; and
(d) a median pore diameter from about 80 Å to about 90 Å;
wherein the foraminous support is selected from the group consisting of silica, silica-alumina, alumina, titania, titania-alumina, zirconia, bentonite, boria, and mixtures thereof.

8. The method of claim 7 wherein:
(a) the Group VIII metal component to Phosphorous component molar ratio is from about 0.05:1 to about 0.59:1;
(b) the Group VIII metal component to Group VIB metal component molar ratio is from about 0.05 to about 0.44:1;
(c) the phosphorous component to Group VIB metal component molar ratio is from about 0.24:1 to 0.775:1; and
(d) the support comprises alumina.

9. The method of claim 8 wherein:
(a) the Group VIII metal is selected from cobalt, nickel and mixtures thereof; and
(b) the Group VIB metal is selected from chromium, tungsten and molybdenum and mixtures thereof.

10. The method of claim 7 wherein the catalyst having a high hydrodenitrogenation (HDN) selectivity for hydroprocessing of a petroleum feedstock exhibits a combination of hydrodenitrogenation (HDN) selectivity greater than 152% and relative metals tolerance of greater than 50%, wherein HDN selectivity is calculated as the ratio of the rate constant for hydrodenitrogenation to the rate constant for hydrodesulfurization (HDS), kHDN/kHDS, and metals tolerance is calculated as the time it takes for HDS activity to fall to 20% of its initial activity.

11. A supported catalyst comprising at least one metal containing catalyst component and at least one phosphorous containing catalyst component, wherein at least one metal in the metal containing catalyst component is a Group VIB metal of the Periodic Table of the Elements selected from chromium, tungsten and molybdenum, and at least one other metal in the metal containing catalyst component is a Group VIII metal Periodic Table of the Elements selected from cobalt, and nickel, and wherein said catalyst components are carried on a foraminous support, said catalyst being characterized as having:
 (a) a Group VIII metal component to Phosphorous component molar ratio of from about 0.05:1 to about 0.59:1;
 (b) a Group VIII metal component to Group VIB metal component molar ratio of from about 0.05 to about 0.44:1;
 (c) a phosphorous component to Group VIB metal component molar ratio of from about 0.24:1 to 0.775:1;
 (d) a median pore diameter of from about 80 to about 90 Å; and
 (e) said support selected from the group consisting of silica, silica-alumina, alumina, titania, titania-alumina, zirconia, bentonite, boria, and mixtures thereof; and
wherein:
 (1) the surface area of the catalyst from about 150 to about 350 $m^2/g$; and
 (2) the total pore volume of the support is from about 0.5 to about 1.1 cc/g.

12. The supported catalyst of claim 11 wherein the support is alumina.

* * * * *